United States Patent [19]

Bortolini et al.

[11] 3,991,096

[45] Nov. 9, 1976

[54] METHOD OF THERMOREGULATING FLUID BED CATALYTIC REACTORS OPERATING AT HIGH TEMPERATURE

[75] Inventors: Paolo Bortolini, Seveso; Vittorio Penzo, Milan, both of Italy

[73] Assignee: Montedison S.p.A., Milan, Italy

[22] Filed: Oct. 22, 1974

[21] Appl. No.: 516,998

[30] Foreign Application Priority Data

Jan. 23, 1974   Italy ................................. 19693/74

[52] U.S. Cl. .......................................... 260/465.3
[51] Int. Cl.² ...................................... C07C 120/14
[58] Field of Search .................................. 260/465.3

[56] References Cited
UNITED STATES PATENTS

| 3,639,103 | 2/1972 | Sheely ..................... 260/465.3 X |
| 3,644,472 | 2/1972 | Paleologo et al. ............... 260/465.3 |
| 3,658,877 | 4/1972 | Callahan et al. ................. 260/465.3 |
| 3,819,679 | 6/1974 | Sheely ............................ 260/465.3 |

Primary Examiner—Joseph Paul Brust

[57] ABSTRACT

Method for controlling the temperature in a reactor for exothermic reactions at high temperature, in the presence of a catalytic fluidized bed, which consists in feeding to a cooling device consisting of heat exchange tubular elements arranged inside the fluidized bed, a controlled amount of water such as to be thoroughly evaporated, superheated steam being generated and the fluidized bed temperature control being obtained by regulating the fed water amount.

6 Claims, 9 Drawing Figures

U.S. Patent  Nov. 9, 1976  Sheet 1 of 4  3,991,096
FIG. 1
PRIOR ART
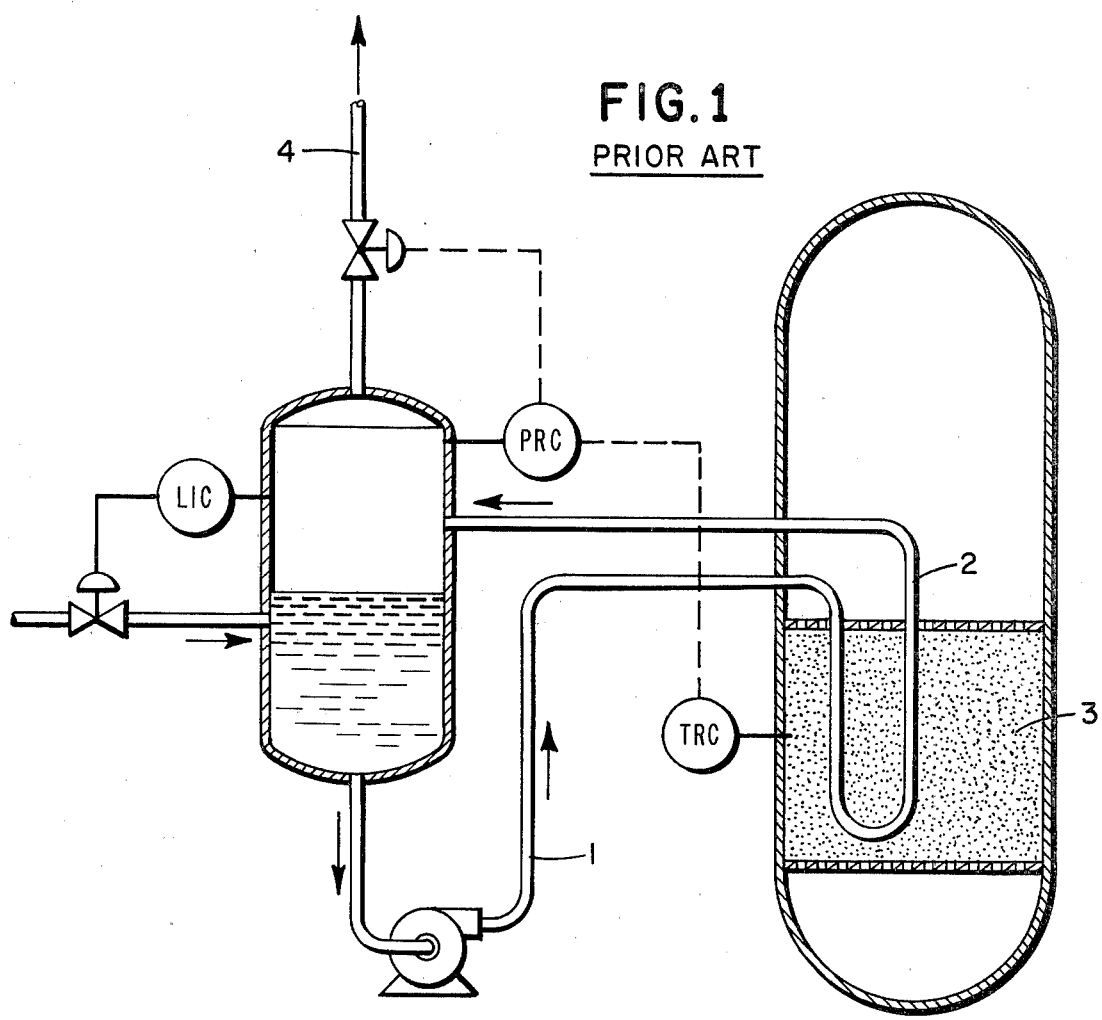
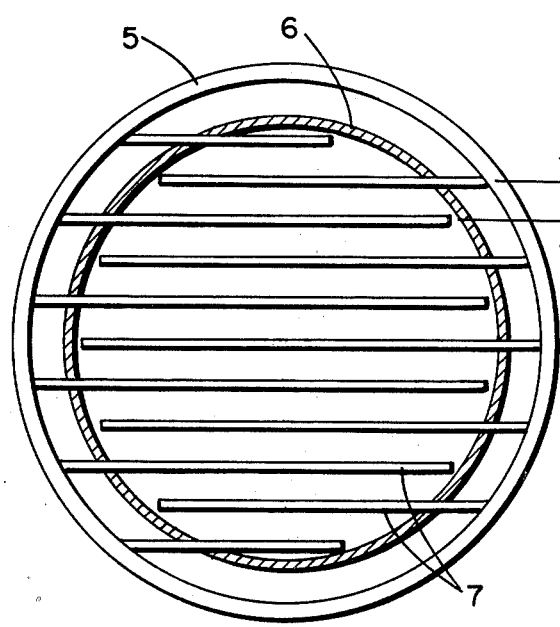
FIG. 2a
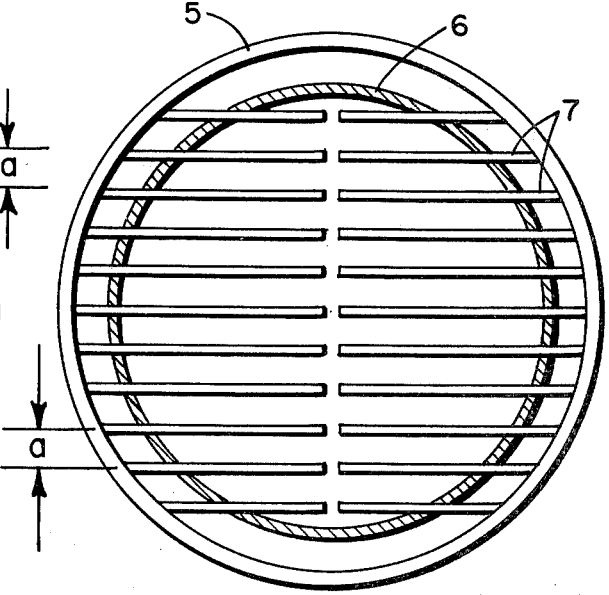
FIG. 2b

METHOD OF THERMOREGULATING FLUID BED CATALYTIC REACTORS OPERATING AT HIGH TEMPERATURE

THE PRIOR ART

As is known, one of the reasons which have most favoured the introduction of fluid bed reactors into the industry is the possibility of obtaining a perfect thermoregulation within very narrow temperature ranges. This characteristic is due to the extra ordinary high conductivity of the bed, which practically permits to attain its isothermicity also when the reduction of heat occurs by means of heat exchange elements considerably spaced from one another and also asymmetrical with respect to the bed.

The prior art thermoregulating method usually employed and illustrated in FIG. 1 of the accompanying drawing consists in introducing water 1 into a coil 2 immersed in the bed 3, under steam 4 generation owing to partial vaporization of the thermoregulation water.

That method is utilizable when the reaction temperature is relatively low (for example less than 250° C). For such temperature values, in fact, it is possible to sensibly vary the thermal difference between bed and cooling fluid by slightly varying the pressure of the generated steam. For instance, when the reactor operating temperature is in the range of 400° to 500° C as, for example, in the case of olefins ammoxidation, it is evident that to obtain a sensible variation of the thermal difference, it would be necessary to considerably vary the steam generation pressure. Thus, for instance, in the case of a reactor operating at 450° C and at a generated steam pressure of 40 kg/cm$^2$, the corresponding thermal difference is 200.8° C, and in order to reduce the same by 10%, the steam pressure should be increased by 15 kg/cm$^2$. In such case it is necessary to thermoregulate the reactor in a different way, for instance by acting either on the exchange surface, i.e. by connecting or disconnecting a part of the coil system, or by varying the amount of generated heat, namely the reagents feeding.

It is clear that the former method is not suited to a continuous automatic regulation, while the latter can be employed only for a regulation in a limited range (fine regulation), as otherwise it would affect the reactor capacity.

Another drawback of the water partial vaporization method, in the case of reactors operating in the aforesaid temperature range, consists in that the generated steam is saturated.

Now, since in such cases the high thermal level permits the generation of high pressure steam, it seems convenient to exploit its energy by expanding it in one or more motive turbines of compressors or pumps.

In such case the steam shall be properly superheated, this being attainable by means of a furnace outside the reactor, or by conveying the saturated steam back to a superheating coil inside the reactor.

In the former case, auxiliary apparatuses and fuel consumption are required, in the latter case construction complications must be overcome in order to house an additional exchange surface of considerable dimensions into the reactor.

Another requirement of the cooling system of a fluid bed operating at high temperatures and in the presence of highly exothermic reactions consists in the possibility of arranging in the bed a very large exchange surface, leaving the space necessary to allow an easy accessibility to the system in case of maintenance and repairs.

When the reactors in question are of large dimensions, the cooling elements immersed in the bed should suitably have a geometrical shape and be symmetrically arranged so as to improve fluidization and to minimize the problems connected with the scale passage (see Chem. Eng. Process, Vol. 58, No. 3, pages 44 to 47).

THE PRESENT INVENTION

The method of thermoregulating a fluid bed reactor according to the present invention meets all the above-cited requirements and more specifically:

a. it permits a perfect, thoroughly automatic thermoregulation with a variability range up to ±1° C also for high operating temperatures of the reactor;

b. it allows a direct generation of steam at high pressure with an adequate superheating degree;

c. it provides the housing, in the bed inside, of a very large exchange surface with an easy accessibility to the system inside and without any particular mechanical complication;

d. it permits a perfectly symmetrical arrangement of the cooling elements.

In the accompanying drawings:

FIG. 1 is a diagrammatic view of a prior art means of thermoregulation in a reactor;

FIGS. 2a and 2b are horizontal sectional views through a reactor showing possible arrangements of manifolds and tubes in a device for carrying out the present invention;

Referring to FIGS. 2a, 2b, and 3 to 8, inclusive, of the drawings, the cooling device to perform the temperature control method of our invention comprises a certain number of equispaced tubes 7 (water manifolds) which, starting from an annular pipe 5 externally of the reactor 6, enter the reactor alternately from opposite sides and pass all through its length (FIG. 2a). For very large reactors (FIG. 2b), the manifolds may reach the reactor center line, in such case symmetrically from two sides of the reactor with respect to a diameter.

Distance $a$ among the internal tubes is at least 500 mm to permit accessibility to the reactor inside.

Figure 3:
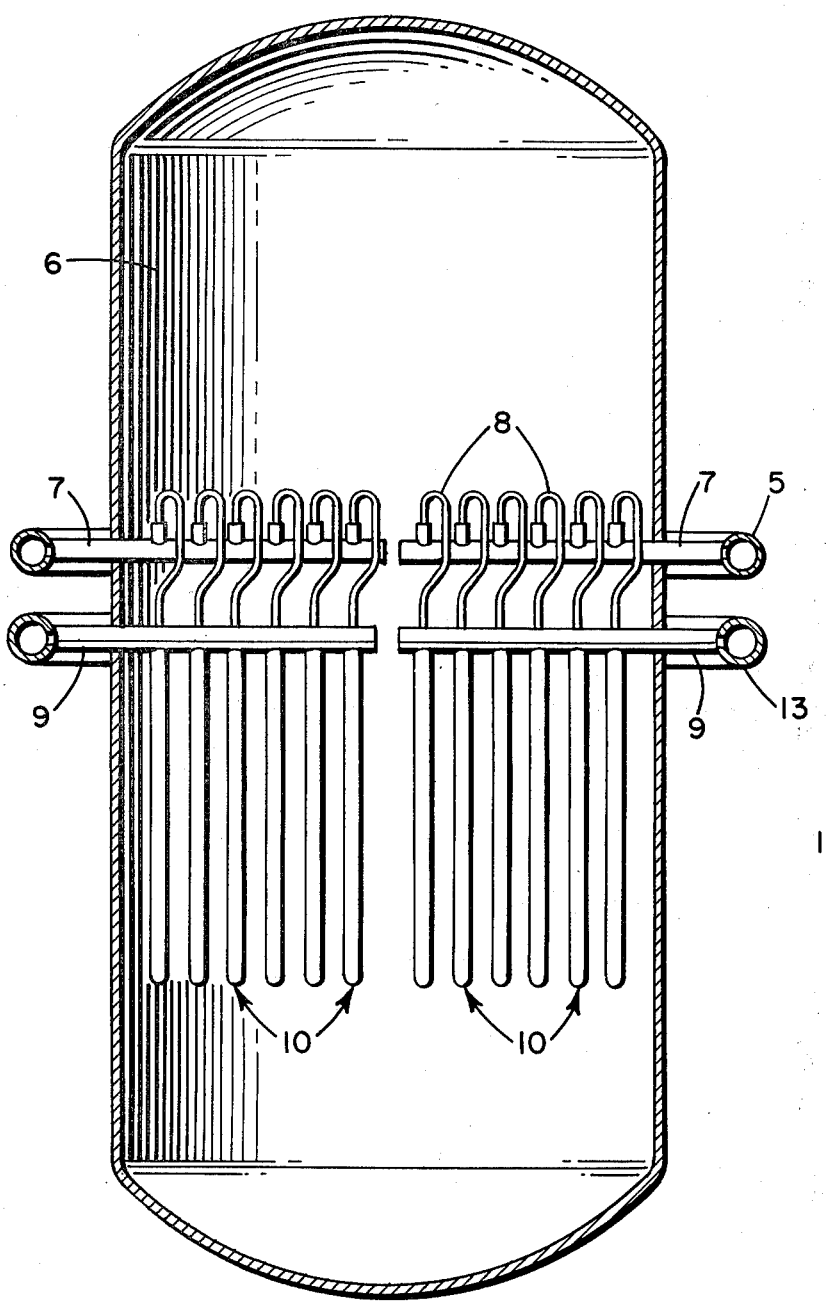
FIG. 3 is an axial sectional view through a reactor employing the cooling system according to this invention.
Figure 4:
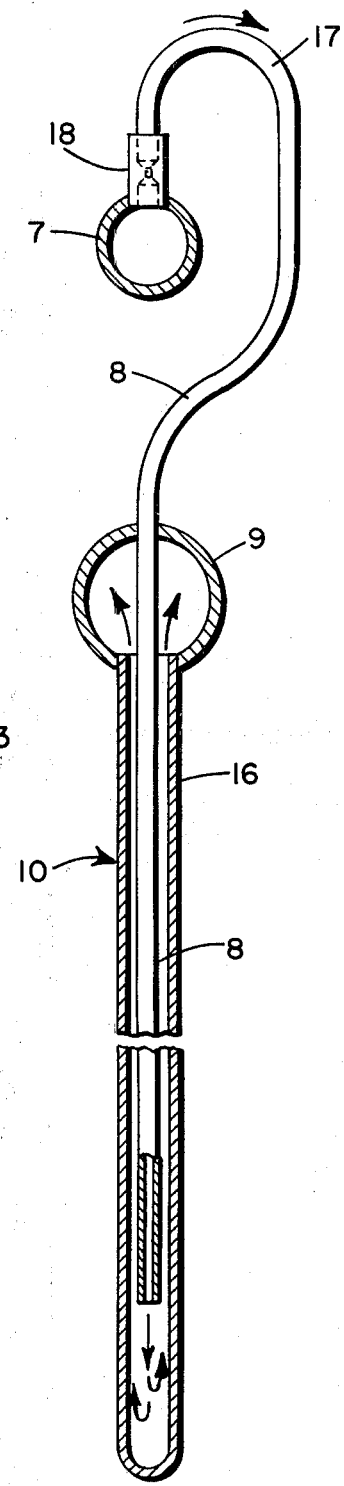
FIG. 4 is a vertical sectional view through the inlet and outlet manifolds shown in FIG. 3 and comprising a detailed showing of a cooling element.

From the water manifolds of FIGS. 3 and 4 a plurality of tubes of smaller diameter 8 which are equally spaced apart start upwards and then bend downwardly to form an inverted-shaped loop 17. The loop 17 formed in tubes 8 permits thermal expansion of the tube. Said tubes pass then through a second manifold 9 (steam manifold) larger than manifold 7, and proceed downwardly internally of a second pipe 16 attached to manifold 9 until stopping at a certain distance from the closed end of said pipe 16. Water is fed (FIG. 5) by a pump 11, at the desired pressure and in a proportioned amount controlled by the temperature regulator 12 of the catalytic bed, to the annular pipe 5. From there, it flows to the water manifolds 7 and then to the individual cooling elements 10. To secure a uniform distribution of water in cooling elements 10, a nozzle 18 is provided at the manifold outlet for each tube 8 (FIG. 6), which causes an adequate pressure drop; dimension $b$ of this nozzle may vary depending upon the reactor sizes and the amount of fed water, and are usually comprised between 1 and 3 mm diameter. Water flows through the internal tube 8 of the cooling element 10, where it is preheated and begins to evaporate, evaporation being completed in the lower part of the external pipe 16.

In the upper part of the pipe 16 the generated steam is superheated and flows into the steam manifold 9, through which it leaves the reactor; and is collected by a second annular pipe 13 and flows to the consuming units.

To adjust the degree to which the steam is superheated it is possible to properly preheat the water, before it flows into the reactor, by means of a steam exchanger 14.

Figure 5:
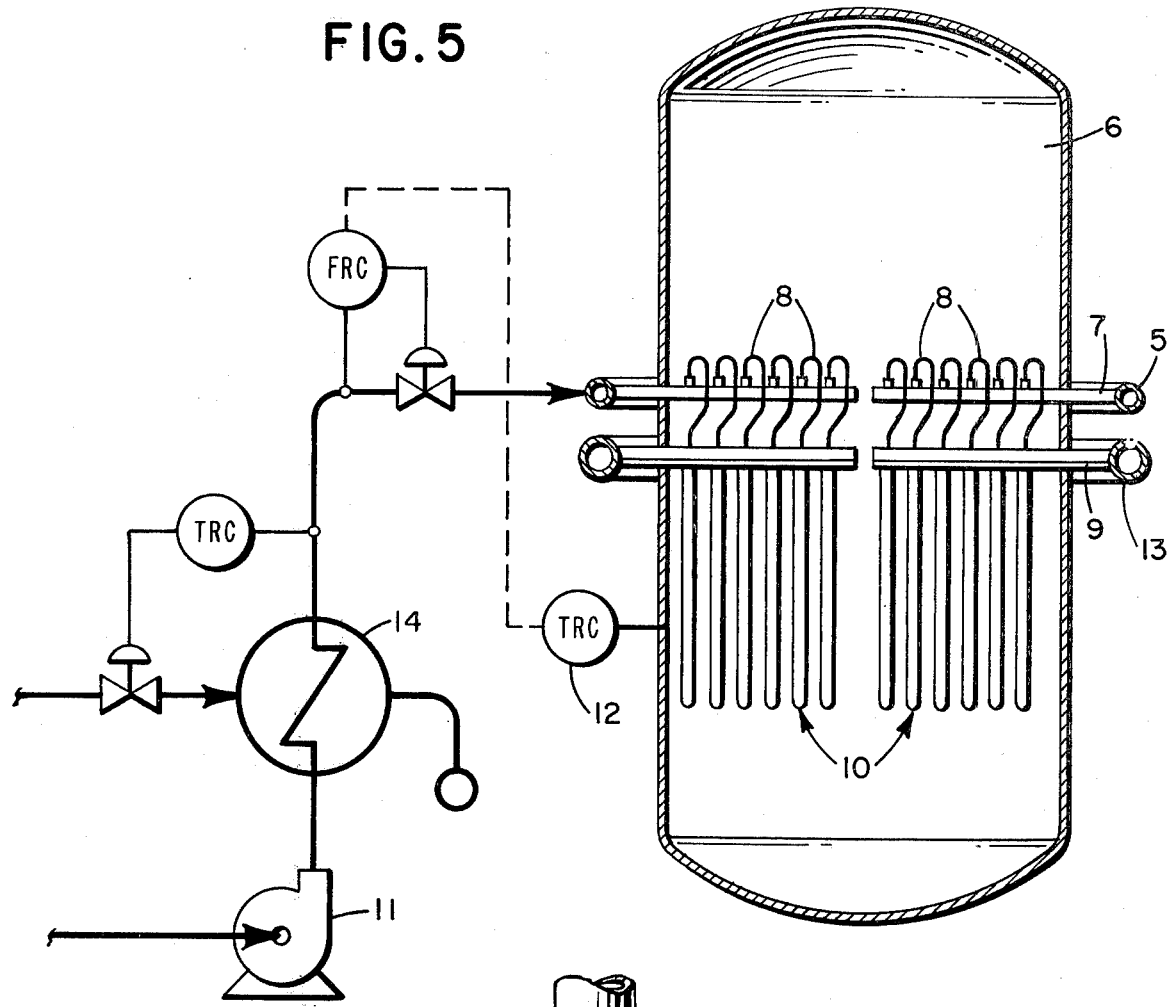
FIG. 5 is a diagrammatic view of our temperature control system.
Figure 6:
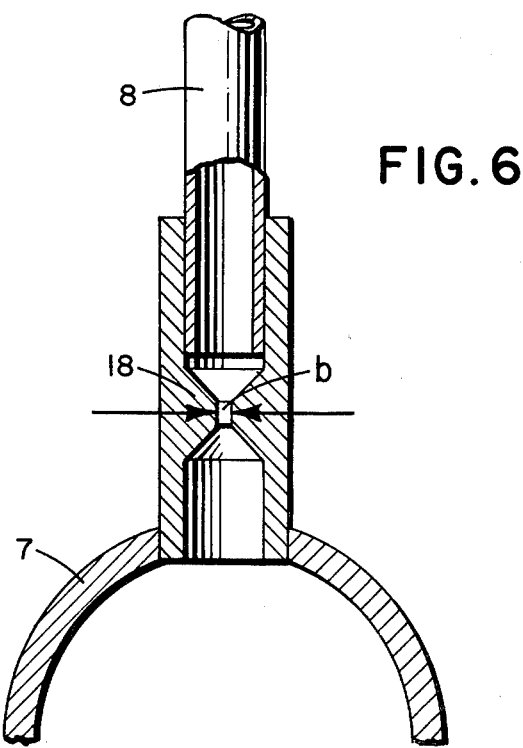
FIG. 6 is a sectional view of the inlet manifold and one of the nozzles associated therewith.

In FIG. 5, "TRC" identifies a temperature regulator; "FRC" identifies a flow regulator in cascade; and the dotted line represents any conventional means, for instance an electrical conductor or pneumatic piping, for actuating the water inlet valve through the flow regulator (FRC).

Figure 7:
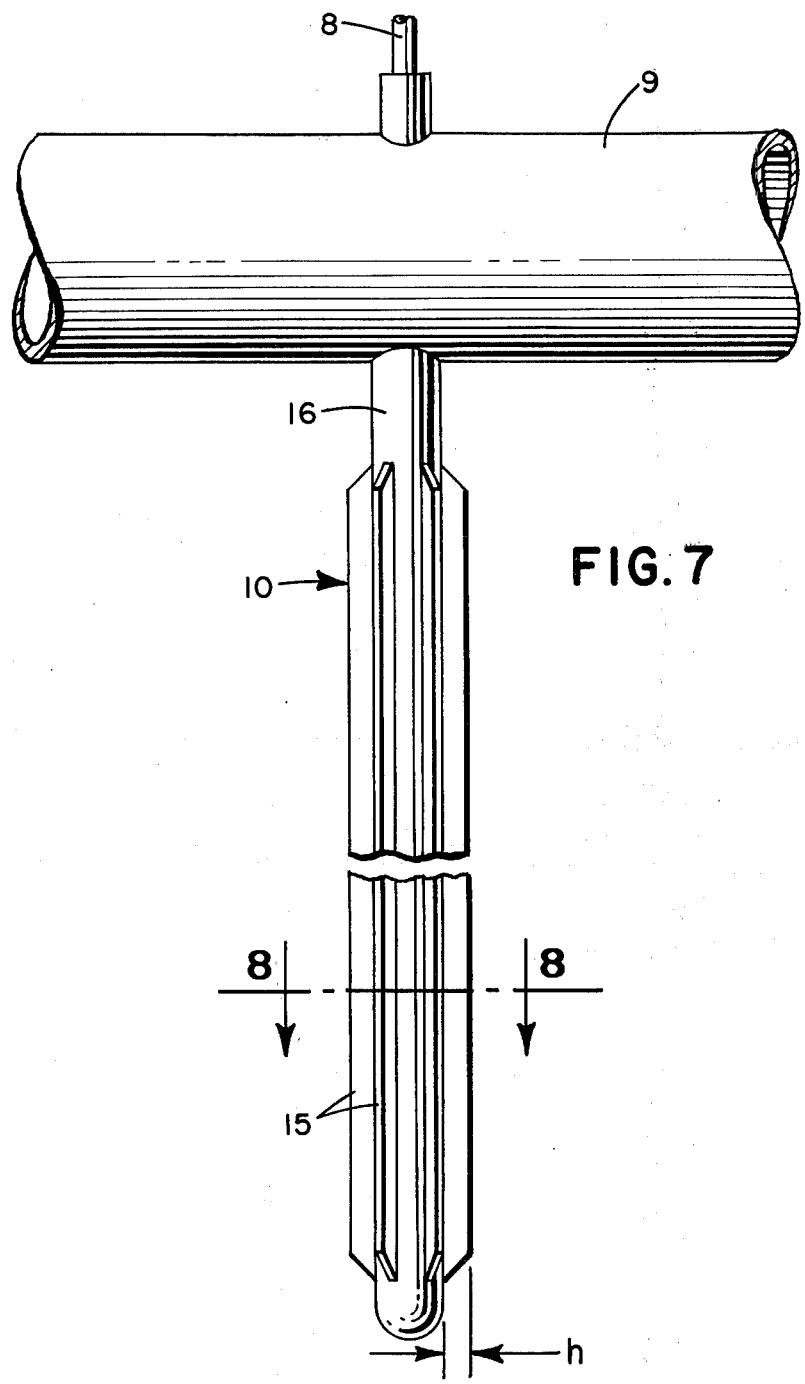
FIG. 7 is a side elevation of the outlet manifold and one of the cooling elements equipped with heat-dissipating fins.
Figure 8:
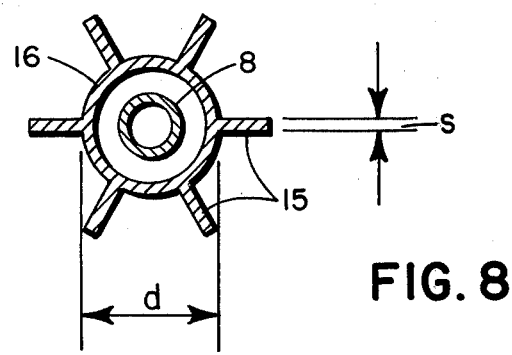
FIG. 8 is a sectional view taken along line 8—8 of FIG. 7.

The external pipe 16 of the cooling element 10 may be finned to increase the heat exchange. In such case the fins 15 must be longitudinal to prevent the formation of dead points in the bed. The number of fins may vary from a minimum of 2 to a maximum of 10. Advisable dimensions are: height $h = 0.3$ to $0.5$ $d$; thickness $s = 0.07$ to $0.12$ $d$, $d$ being the outside diameter of the cooling element, pipe 16 (FIGS. 7 and 8).

The following example is given to illustrate a practical embodiment of the cooling method according to the present invention.

EXAMPLE

In a continuous synthesis process of acrylonitrile through propylene ammoxidation, propylene, ammonia and air were fed to a catalytic fluid bed reactor; the reaction temperature was 450° C and the pressure about 2 kg/cm² abs.

The reaction thermal control was secured by a cooling system of the type described hereinbefore, immersed in the catalytic bed.

Thermoregulating water, in an amount ranging from 3 to 6 kg per kg of fed propylene, was preheated under pressure up to 175°–185° C in a heat exchanger, utilizing steam at 18 kg/cm² abs. as heating medium, and it was then fed to a reactor heat exchanger, of the type described hereinbefore, provided with tubular elements immersed in the catalytic fluidized bed. Water thoroughly vaporized, at a pressure kept at 34–38 kg/cm² abs., and steam was superheated up to 320°–350° C. This superheated steam was utilized in turbines coupled to air compressors and centrifugal pumps.

The reaction temperature was regulated by adjusting the water flow by means of a temperature regulator, whose sensible element was immersed in the catalytic bed.

The reaction temperature in the fluidized bed was thus kept at the prefixed value of 450° C, with a difference of ±1° C.

What we claim is:

1. In the ammoxidation of olefins in a reactor for exothermic reactions at high temperature and in the presence of a catalytic fluidized bed, the improvement which consists of controlling the temperature during the ammoxidation by feeding a controlled and adjustable amount of water to a cooling device consisting of heat exchange tubular elements arranged inside the fluidized bed, the amount of water introduced being such that the water is thoroughly evaporated, the generated steam is superheated under further heat absorption, at high temperatures, from the fluid bed, and the control of the heat exchange and therefore of the temperature of the fluid bed is essentially obtained by regulating the amount of water fed.

2. The improvement of claim 1, further characterized in that the water is fed to a cooling device essentially consisting of heat exchange tubular elements, vertically arranged; containing an inside coaxial water-feeding tube ending a short distance above the lower, closed end of the heat exchange tubular element, said inside coaxial tubes being connected in parallel with feeding water horizontal manifolds, and said heat exchange tubular elements being connected, at their upper ends, with superheated steam horizontal manifolds.

3. The improvement of claim 2, further characterized in that the water is fed to internal coaxial tubes connected with the water manifold through a nozzle having such dimensions as to cause a pressure drop sufficient to permit an easy regulation of the water flow and a uniform distribution of the water in all of the tubes.

4. The improvement of claim 2, further characterized in that the ammoxidation is carried out in a reactor comprising water manifolds equispaced throughout its length and arranged to enter the reactor alternately from opposite sides thereof starting from an annular pipe externally of the reactor.

5. The improvement of claim 2, further characterized in that the water is fed to internal coaxial tubes of a shape, and so arranged with respect to the water manifolds, as to permit thermal expansion, and thereafter passes downwardly through a steam manifold.

6. The improvement of claim 2, further characterized in that the ammoxidation is carried out in a reactor comprising water manifolds equispaced throughout its length and arranged symmetrically to reach the center of the reactor from two sides thereof with respect to a diameter.

* * * * *